US006468645B1

(12) United States Patent
Clausi

(10) Patent No.: US 6,468,645 B1
(45) Date of Patent: Oct. 22, 2002

(54) MOLDING FINELY POWDERED LIGNOCELLULOSIC FIBERS INTO HIGH DENSITY MATERIALS

(76) Inventor: Robert N. Clausi, 1485 Devon Rd. Matrix Composites Inc., 2370 South Sheridan Way, Mississauga, ON (CA), L5J 2M4

( * ) Notice: Subject to any disclaimer, the term of this patent is extended or adjusted under 35 U.S.C. 154(b) by 0 days.

(21) Appl. No.: 09/582,910

(22) PCT Filed: Jan. 7, 1998

(86) PCT No.: PCT/CA98/00011

§ 371 (c)(1), (2), (4) Date: Sep. 5, 2000

(87) PCT Pub. No.: WO99/34963

PCT Pub. Date: Jul. 15, 1999

(51) Int. Cl.[7] .................................................. B32B 5/14

(52) U.S. Cl. ................................ 428/308.8; 428/305.5; 428/311.11; 428/311.51; 428/317.1; 524/13; 524/14; 524/72; 524/81; 524/284; 524/327; 524/492

(58) Field of Search ........................... 428/305.5, 308.8, 428/311.11, 311.51, 317.1; 524/13, 14, 72, 81, 284, 327, 492

(56) References Cited

U.S. PATENT DOCUMENTS 3,519,580 A * 7/1970 Schou et al.
4,746,555 A * 5/1988 Luckanuck .................. 428/35

FOREIGN PATENT DOCUMENTS

| | | | |
|---|---|---|---|
| EP | 0046014 | * | 2/1982 |
| GB | 400439 | * | 10/1933 |
| GB | 2265150 | * | 9/1993 |
| WO | WO 92/06832 | * | 4/1992 |
| WO | WO 94/00280 | * | 1/1994 |

* cited by examiner

*Primary Examiner*—Samuel A. Acquah
(74) *Attorney, Agent, or Firm*—Smith, Gambrell & Russell, LLP

(57) ABSTRACT

A molded fiber product is made from plant fibers containing lignin. Plant fibers ranging in size below 0.5 mm are used. Binding agents and other additives may be mixed with the fibers to enhance product or process performance. The plant fiber mixture of fibers and additives are heated at temperatures between 40 degrees C. and 300 degrees C. The heated fibers are compressed in a mold to an average density of at least 960 kg/m$^3$. Compression pressures of at least 3.4 MPa are used. The compressed fiber product is released from the mold and the mold may be reused. A thermoset molded plant fiber product is provided having characteristics and qualities similar to engineering grade thermoplastics and thermoset plastics.

75 Claims, 1 Drawing Sheet

MOLDING FINELY POWDERED LIGNOCELLULOSIC FIBERS INTO HIGH DENSITY MATERIALS

Figure 1:
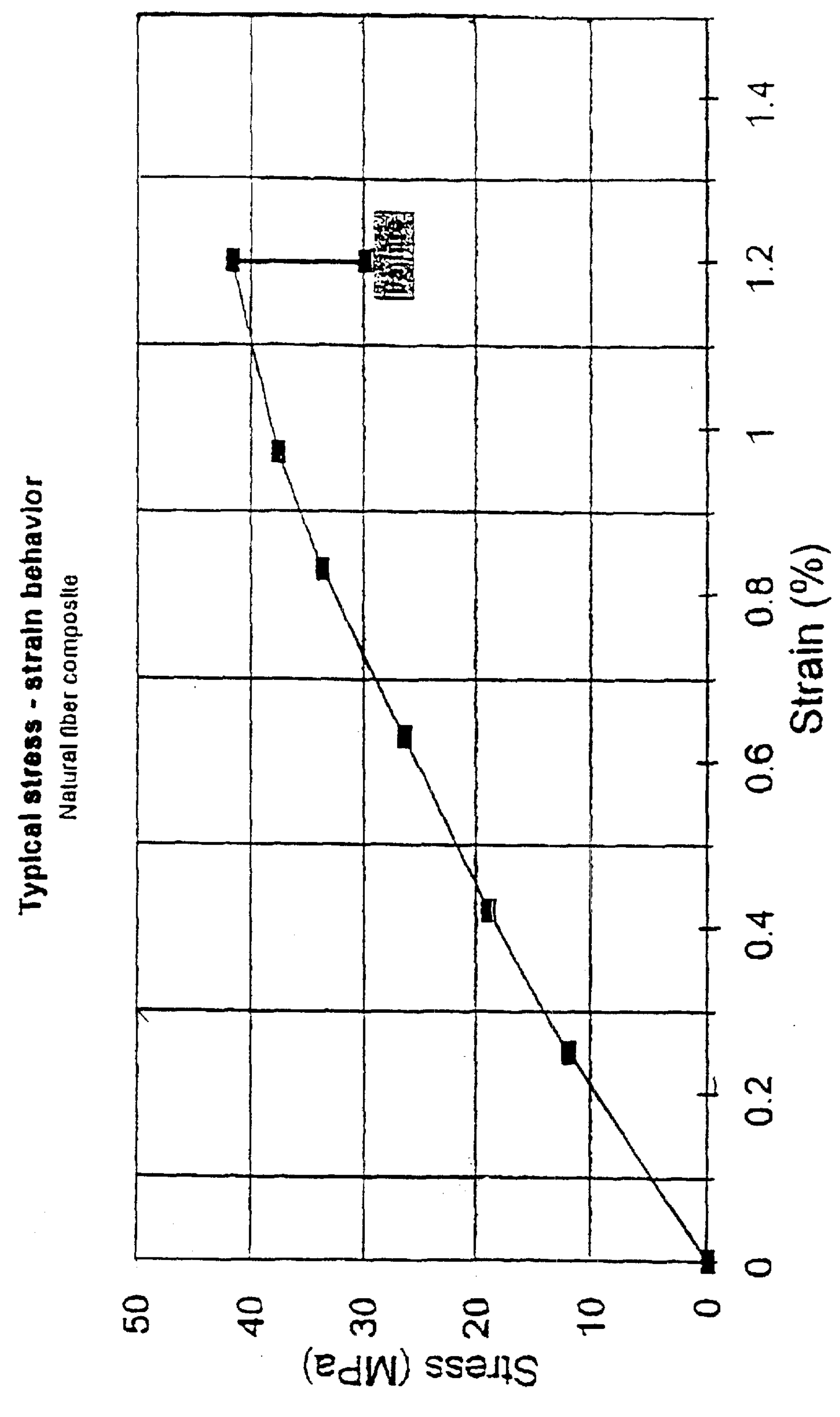

This application is a 35 U.S.C. §371 application of International PCT Application No. PCT/CA98/00011; filed Jan. 7, 1998.

BACKGROUND OF THE INVENTION

This invention relates to the manufacture of molded materials from finely powdered plant materials containing lignin. In particular, the invention provides a method of making a high density molded thermoset powdered plant material with characteristics and qualities similar to engineering grade thermoplastics and thermoset materials. Plant fibers of less than 500 microns in size are compressed into resilient, molded materials. Products manufactured by using the method of the invention are also described.

RELATED ART

In the systems of the prior art, long strands, fibers, flakes or chips of wood are commonly used to manufacture low and medium density boards, felts or other materials for building and other uses. However, this conventional technology has focussed on physically bonding such pieces into agglomerations forming the boards, felts and other materials. The strength characteristics of the final products were ultimately limited by the strength of the individual fibers that had been bonded or glued together and the interfacial bonds between the fibers and the glue. Typically, wood fibers, chips, and flakes much larger than 3000 microns were used as a raw material source for these conventional manufacturing techniques.

Furthermore, prior art systems typically employed multiple stages to form the desired products. For example, intermediate felts and other shapes would be formed and would then be subjected to additional chemical or physical treatments including calendaring, pressing, dewatering or other processes.

In general, wood treatment related technologies have developed separately from efforts to utilize other naturally occurring plant materials. Whether in the field of wood processing technology or in the processing of other plant materials, those efforts have taught and advanced the use of larger raw material particles of sizes averaging well above 3000 microns.

One attempt at physically bonding somewhat smaller particles of straw is briefly described in UK patent application number GB 2 265 150 A, dated Sep. 22, 1993 by Brian Harmer (hereafter called "Harmer"). However, that reference teaches the use of straw fibers within a broad range of fiber sizes, all of which are much larger than the plant fibers of the present invention. Indeed, Harmer, teaches the use of a different process using much larger straw fibers of various sizes within a broad range of more than 500 microns and up to about 3000 microns. Harmer teaches that straw particles within a range of 500 microns to 2000 microns are preferred. Harmer, like many references in the area of wood fiber technology, teaches away from the use of very fine powders of less than 500 microns in diameter. Further, Harmer teaches the use of styrene to form a protective outer skin on the resulting product to inhibit water absorption.

In addition, the use of a broad range of particle sizes of up to 3000 microns in that process will result in a final product with a highly textured surface having discreet particles which are clearly visible to the naked eye. In part, the use of larger straw particles was taught by Harmer as a means of avoiding difficulties associated with that process, including the use of a two stage phenolic resin and hexamine as a cross linking agent. The phenolic glue system, once polymerized, produces a physical bond between the fibers and the glue. To reinforce this physical bond, Harmer uses hexamine as a crosslinking agent to enhance the physical bonding characteristics. Also, Harmer does not teach how to avoid problems associated with the application of conventional mixing techniques to satisfactorily combine a powdered two stage phenolic resin including hexamine with very finely powdered straw fibers of sizes below 500 microns. Harmer also does not teach how to avoid premature reactions of liquid additives or other powdered additives which may be included in a plant fiber formulation.

DESCRIPTION OF THE PRESENT INVENTION

In the present invention, very finely powdered lignocellulosic plant fibers of below 500 microns are used. Typically, such fibers will have a maximum length of 500 microns, with particle diameters ranging between about 20 to 50 microns. It is understood that such particles are irregularly shaped, within a broad range of sizes of up to 500 microns in effective size. In many applications, plant fibers of less than 250 microns will be preferred. It will be understood by those skilled in the art that the size of such particles will typically fall within a range of particle sizes characterized by screening or other suitable grading techniques. In some instances, the size of such particles is referred to as an effective diameter, or effective size however, the actual size of a given irregularly shaped particle will not necessarily correspond to the effective size of the particle. Rather, the effective size will relate to the tendency of the particle to pass through a sieve or other screening or grading device.

Plant fiber particles containing lignin are desired to enhance the binding characteristics of the thermoset binding agents described further below.

Finely powdered wood fibers derived from hardwoods and softwoods may be used provided they have not been pretreated to remove significant amounts of lignin and related naturally occurring components of wood. Other suitable lignocellulosic materials include finely powdered flax, hemp, grasses, jute, and various agricultural products and waste plant materials containing lignin.

The finely powdered plant fibers are preferred to have a moisture content of less than about 50 per cent by weight and more preferably, between about 5 per cent to about 20 per cent by weight. For example, in processes utilizing polymeric diphenyl methane di-isocyanate, substantial concentrations of moisture in the plant fibers will enhance bonding within the plant fiber mixture.

According to the method of the present invention, the finely powdered plant fibers are mixed with a thermoset binding agent, and preferably, a release agent. The plant fiber and additive mixture is introduced to a heated mold operating between 40 degrees C. and 300 degrees C. In certain systems, lower reaction temperatures of about 40 degrees C. will be effective at relatively higher pressures. For example, binding agents such as polyester resin in plant fiber may be mixed with organic peroxide in plant fiber at about 40 degrees C. In heat sensitive binding agent systems, operating temperatures of up to 300 degrees C. may be applied for relatively short pressing cycles. In such cases, some degree of surface charring or other imperfections may arise. Such imperfections may be removed by subsequent operations, or may remain if they will not detrimentally affect the product's expected performance. Preferred operating temperatures range between 100 degrees C. and 220 degrees C., and more preferably between 160 degrees C. and 220 degrees C.

The contents of the mold are heated and compressed under pressures of at least 500 psi, with preferred operating pressures greater than 1000 psi and higher.

The resulting products have average densities of at least 60 pounds per cubic foot. Higher average product densities of more than 80 pounds per cubic foot and more than 90 pounds per cubic foot are also provided. Higher product densities will in many instances provide for enhanced physical and mechanical characteristics. Such characteristics will correspond to specific formulations and may include one or more of such properties as increased strength, impact and wear resistance, decreased water absorption, and increased dimensional stability.

In one embodiment of this invention, a high density plant material is manufactured by a method comprising the steps of:

(a) introducing into a mold a mixture comprising powdered plant fiber particles of less than 500 microns, thermoset binding agent between at least 0.1 per cent and 50 per cent by weight of the plant fiber particles;

(b) operating the mold at a temperature between 40 degrees C. to 300 degrees C.;

(c) applying a pressure of at least 500 psi to the contents of the mold;

(d) compressing the contents of the mold to an average density of at least 60 pounds per cubic foot; and (e) releasing the contents from the mold.

Internal or external mold release agents may be used in those applications requiring a release additive. An external mold release agent may be introduced to the mold separately from the plant fiber mixture. Alternatively, mold release additives may be added to the plant fiber mixture to be compressed within the mold. Although a mold release may be desirable in many instances, such additives may not be required in all applications.

In another embodiment of this invention, a high density plant fiber product is formed by using a method comprising the steps of:

(a) mixing one or both of (i) a first amount of powdered plant fiber of less than 500 microns and a thermoset resin and (ii) a second amount of powdered plant fiber of less than 500 microns and one or more additives;

(b) preparing a plant fiber mixture containing thermoset resin in a concentration of between 0.1 per cent and 50 percent by weight of powdered plant fiber comprising mixing one or both of the first and second amounts with other additives;

(c) introducing the mixture of plant fibers and additives into the cavity of a mold;

(d) compressing the mixture by applying a pressure of at least 500 psi to the surface of the mixture;

(e) heating the mold cavity to between 40 degrees C. to 300 degrees C.;

(f) compressing the contents of the mold to a density of at least 60 pounds per cubic foot; and (g) removing the compressed contents from the mold.

A combination of one or more of mineral and non-mineral additives may be provided to enhance the process or the performance characteristics of the final products. By way of example, such additives may include one or more synthetic additives including, synthetic catalysts and synthetic pigments, glass microspheres, glass fibers, carbon fibers, aramid fibers, metallic particles and other compatible additives. The use of these additives may provide enhanced product strength, impact resistance, wear resistance, dimensional stability and other favourable product qualities. Concentrations of additives in plant fiber mixtures of up to 50 per cent by weight of fiber are provided. In one aspect of this invention, mineral additives, including silicate additives, silica or silica sand, in concentrations up to 50 percent by weight of plant fiber, are provided. Coupling agents may be added to improve the bonding of the inert mineral and non-mineral additives within the final product.

In another aspect of this invention, a plant fiber product is formed by molding a desired shape to an average density of at least 60 pounds per cubic foot. The product is made substantially from powdered plant fibers containing protolignin, a thermoset binding agent in a concentration of between about 0.1 per cent and 50 per cent by weight of plant fiber, and a release agent. The fibers have an effective size of less than 500 microns.

In another aspect, the invention includes a plant fiber product mixture comprising protolignin containing plant fibers of between 20 and 500 microns in size, a release agent, and a concentration of binding agent of less than 50 per cent by weight of plant fibers.

FIG. 1 is a graphic representation of the typical stress-strain relationship in a product of the present invention made from finely powdered natural fibers mixed with a binding agent and compressed in accordance with the method.

DETAILED DESCRIPTION OF THE INVENTION

In accordance with the present invention, thermoset binding agents are used to react with and bind together finely powdered lignocellulosic plant fibers. The binding agents include unsaturated polyester resin, polymeric diphenyl methane di-isocyante, methane di-isocyante, melamine, urea, phenolic formaldehydes, and ester containing compounds.

Traditionally, phenolic formaldehyde resins have presented environmental and health concerns in certain applications. Accordingly, polyester and PMDI resin systems are preferred in those applications where such issues may arise.

Thermoset binding agents are desirable to provide products that are stable under a broad range of heating and temperature conditions. The particular binding agent may be selected to achieve the most desirable process conditions and product characteristics for certain applications. For example, polymeric diphenyl methane di-isocynate (PMDI) is desirable in many applications using plant fibers having some residual water content. The presence of moisture within the range of about 5 to 50 per cent by weight of plant fiber is acceptable, with a preferred moisture content between about 5 per cent and 20 per cent by weight of fiber.

The presence of moisture in the fibers permits or causes the cross linking and other reaction mechanisms which occur during the compression of the fiber mixtures under elevated temperatures and pressures of the method of this invention. It is noted that the specific reaction mechanism which may be involved is not claimed or considered to be an essential element of the present invention.

In one preferred aspect of the invention a thermoset resin, in particular, polymeric diphenyl methane di-isocynate (PMDI) is added to finely powdered plant fibers of less than 250 microns. PMDI concentrations ranging between 0.1 per cent and 50 per cent by weight of plant fiber can be used. PMDI concentrations of between 1 per cent and 25 per cent by weight are preferred in certain instances where other suitable additives are also included in the plant fiber mixture to be compressed. Other useful mixture formulations using relatively small concentrations of binding agents such as PMDI are also within the scope of this invention.

If one or more reactive additives will be included in the plant fiber mix to be molded into a product, sequential dilution or mixing of the ingredients may be used to inhibit premature reaction of the mixture ingredients. Similarly, if small concentrations of additives will be utilized, and it would be difficult to accurately disperse those additives in one mixing step, two or more sequential mixing steps or dilution steps may be used to more accurately and precisely regulate the final mixture concentrations.

In one example, an additive such as a catalyst or release agent is to be added in concentrations of about 1 per cent to a relatively small batch of plant fiber mixture. A predetermined amount of the additive may be added to a first batch of powdered plant particles, also provided in a predetermined amount. The initial mixing ratios may be calculated according to the technical specifications or limitations of the weight measuring and mixing equipment to be used in the process.

If the available equipment is satisfactory for measuring and mixing a batch of 10 per cent weight by weight concentration of additive in wood fiber, 10 parts by weight of additive may be mixed with 100 parts of wood fiber to give a first batch of plant fiber mixture A. Thereafter, if the target concentration of additive is 1 per cent by weight of wood fiber in the final plant fiber mixture B which is to be compressed, a portion of the first batch A may be measured, diluted and mixed a second time based on a final mixture of 10 parts by weight of the first batch A and 100 parts by weight of powdered wood fibers. It will be appreciated that this example is based on three steps of measuring, diluting, and mixing additives to the plant fibers based on mixture ratios of 1 to 10 in both instances. However, it will be understood that a different number of sequential dilution steps may be used where it is necessary or desirable to do so, and that different dilution ratios may be used to achieve the target concentrations of thermoset resin, additives, including release agent, in the intermediate and final plant fiber mixtures. By way of further example, in some instances, it may desirable to sequentially mix only one ingredient with the plant fiber material and then mix an amount of that intermediate mixture with the remaining ingredients, and if necessary, additional plant fibers, to yield the desired concentrations of thermoset resin, additives and release agent. The resulting mixture may then be compressed within the mold.

It will also be understood that although this example referred to mixing batches of plant fiber mixtures, this process may also be adapted to continuous mixing operations.

In many instances it will be very desirable, but not necessary, to include release agents within the plant fiber mixture to be compressed. Release agents will enhance the ability to successfully remove the pressed product part from the mold after completion of the compression step. For example, relatively small concentrations of stearates have been found to be useful release agents in applications including thermoset binders including PMDI.

Metallic stearate may be included in formulations including PMDI and plant fiber mixtures to enhance the release mechanism of the mixture within the mold. For example, zinc stearate, calcium stearate and magnesium stearate concentrations of between about 0.01 per cent and about 5 per cent by weight of plant fiber were useful. Metallic stearate additives provide for improved product characteristics including moisture resistance and material flow.

Other examples of acceptable release agents to be used in PMDI and plant fiber mixtures include potassium oleate, or silicone based or wax based release agents. Again, the selection of the desirable agent will depend upon a number of process parameters and product qualities desired to be achieved in particular applications.

In another aspect of this invention, substantial quantities of mineral and non-mineral additives may be added to the plant fiber formulations to impart beneficial physical and mechanical characteristics. For example, the introduction of silicates, silica, silica sand, or other additives into the plant fiber formulations can also inhibit surface abrasion and wear of the finished products. Concentrations of silicates, silica or silica sand of less than 50 per cent by weight of plant fiber may be used to provide improved product performance in comparison to various conventional materials. Concentrations of silicates of more than 2 per cent by weight of plant fiber are preferred.

When using silicate, silica or sand based plant fiber formulations it may be desirable to include a coupling agent. For example, silane is a useful coupling agent in plant fiber mixtures including sand, PMDI and lignocellulosic plant fibers.

In other aspects of this invention, it is possible to include synthetic and plant fiber materials having specific physical characteristics to impart other desirable product qualities. For example, synthetic fibers, carbon fibers, glass fibers and natural fibers may be added to the plant fiber mixture to be pressed. It is possible to use core materials such as compressed lignocellulosic plant fiber mixtures of the present invention as a base supporting added outer layers of carbon fiber laminates and glass fiber laminates. Such laminates may be selected to provide improved dimensional stability or other qualities characterized by the final laminate product.

In general, operating temperatures for the molding step range between 40 degrees C. and 300 degrees C. Temperature ranges between 100 degrees C. and 220 degrees C. are preferred. The mold will typically be operated within a relatively narrow temperature band to permit better control over process parameters and product consistency. Compression pressures may be selected from at least 500 psi to a much higher range of compression pressures of 1000 psi, 2000 psi and more. The selection of specific temperature and pressure process variables will affect the in-mold pressing time and other parameters in the molding process. Certain additives, including mineral and non-mineral additives, for example, silica or silica sand, may be added to reduce pressing cycle times by improving heat conductance of the plant fiber mixture. It will be understood that complex product formulations or geometries may significantly alter the actual in-mold residence time for a particular process application.

Other additives may be included in the plant fiber formulation, depending upon the final product characteristics which are sought. Additives including fire retardants, colouring agents, surface agents to impart anti slip features or esthetic characteristics may also be used in certain plant fiber formulations. Minute quantities of fine metallic particles or small multicoloured glass particles may be added at between about 0.1 per cent and about 10 per cent by weight of fiber to achieve desirable surface finishes and appearance.

The use of finely powdered plant fibers also enhances the appearance of the outer surface of the final product. If colouring agents are used with fibers below 500 microns, it is possible to achieve far superior blending of colours and consistency in the outer appearance without any noticeable fiber-like texture in the final product. Further, the use of finely powdered plant fibers enhances the uniformity of the appearance and texture throughout the product. It is possible to produce a product that has consistent colour and other textural characteristics that go beyond the outer surfaces. This characteristic is unique in that many other systems merely develop a product with a thin outer skin that would be unsuitable for sanding or other repair work when damaged, and in cases where colour differences arise, additional paint or other repairs may be required.

The products of the present method exhibit exceptional performance characteristics including relatively little water absorption, increased tensile strength and impact resistance. The specifications of the final product may be designed to achieve particular features by, for example, adjusting the final average density of the product part. The present method may be used to impart densities which are significantly higher than the densities of the corresponding raw plant fiber material. Indeed, many of the product formulations subjected to higher temperature and pressure treatments of this method result in products having specific gravities well in excess of 1.0 as compared with many of the prior art systems based on wood particles which resulted in significantly lower densities.

The products of this process may be specifically designed to develop integral low density and high density zones. Unlike many conventional materials, including plastics and metals, which necessarily exhibit a substantially uniform density after molding a part, the products of this invention may be designed to have distinct density zones, with each having its own desirable physical characteristics. Accordingly, certain zones may be selected to experience a relatively higher degree of compression to achieve higher localized densities in comparison to other lower density zones which have been compressed to a lesser degree. For example, the high density zones may be desirable for added strength, durability characteristics and the lower density zones may be provided in localized areas to permit easier trimming, cutting, or fastening steps including drilling, or nailing or other working of the product material.

Table 1 shown below illustrates typical properties of products manufactured according to the present invention based on formulations of plant fibers and thermoplastic binding agents identified as formulations A to D inclusive.

TABLE 1

Mechanical and physical properties of examples of natural fiber compositions of the invention.

| Composition/ Property | Tensile Modulus (GPa) | Tensile Strength (MPa) | Failure Strain (%) | Hardness Rockwell M | Water Absorption (%) | Thickness Swell (%) |
|---|---|---|---|---|---|---|
| ASTM No. | D638 | D638 | D638 | D785 | D1037 | D1037 |
| Composition A | 4.3 | 37.3 | 1.4 | 31.16 | 4.9 | 4.0 |
| Composition B | 4.4 | 40.4 | 1.4 | 63.12 | 3.8 | 3.8 |
| Composition C | 4.9 | 45.5 | 1.5 | 64.20 | 2.7 | 3.0 |
| Composition D | 5.8 | 45.4 | 1.6 | 79.42 | 6.3 | 7.0 |

Table 2 illustrates typical properties of formulations E and F, described further below.

TABLE 2

Properties of Glass Fibers and Carbon Fiber Compositions

| Composition/ Property | Tensile Modulus (GPa) | Tensile Strength (MPa) | Failure Strain % |
|---|---|---|---|
| ASTM No. | D638 | D638 | D638 |
| Composition E | 5.3 | 42.9 | 1.2 |
| Composition F | 5.4 | 36.8 | 0.9 |

Table 3 and 4 below show the ingredients and process conditions used to produce multiple test samples of each formulation. Concentrations of resin (PMDI) and other additives are given as per cent (w/w) of plant fiber. Test data such as process temperature, pressure and cooking time are average values calculated for the tested samples for the various compositions.

TABLE 3

Ingredients in Compositions A to F (% w/w of wood fibers less than 250 microns)

| Composition | Resin (PMDI) | Zn Stearate | Ca Stearate | Silane | Silica Sand | Na-silicate | lass ibers | Carbon Fibers |
|---|---|---|---|---|---|---|---|---|
| A | 5 | 0.25 | 0.025 | 0.5 | 0 | 0 | 0 | 0 |
| B | 10 | 0.5 | 0.05 | 0 | 0 | 0 | 0 | 0 |
| C | 10 | 0.4 | 0.02 | 0.4 | 10 | 0 | 0 | 0 |
| D | 10 | 0.5 | 0.05 | 0.5 | 0 | 25 | 0 | 0 |
| E | 10 | 0.4 | 0.02 | 0.2 | 0 | 0 | 5 | 0 |
| F | 10 | 0.4 | 0.02 | 0.2 | 0 | 0 | 0 | 5 |

TABLE 4

Process Conditions and Resulting Sample Thickness

| Composition | Pressure (psi) | Temp. (Degrees C.) | Thickness/mm | Cure time (sec) |
|---|---|---|---|---|
| A | 2800 | 135 | 6.87 | 100 |
| B | 2900 | 130 | 6.6 | 140 |
| C | 2900 | 122 | 6.11 | 122 |
| D | 2850 | 135 | 6.05 | 135 |
| E | 2800 | 122 | 6.27 | 255 |
| F | 2800 | 120 | 6.2 | 255 |

TABLE 5

A Comparison of Physical and Mechanical Properties of a Sample Product of the Invention (Composition B) With Other Materials.

| Material/Units | Density (g/cc) | Tensile Strength (Mpa) | Tensile Modulus (Gpa) | Failure Strain (%) | Maximum Op. Temperature (° C.) |
|---|---|---|---|---|---|
| Composition B | 1.34 | 40.4 | 4.4 | 1.4 | 200 |
| P (propylene) | 0.91 | 36.0 | 1.31 | 22 | 100 |
| Wood-Thermoplastic | 1.10 | 20.7 | 1.75 | 18.5 | 100 |
| Flax-Thermoplastic | | | | | |
| P (propylene) | 0.96 | 36.3 | 2.20 | >18 | 100 |
| Grade 4/PP | 0.98 | 29.4 | 2.0 | >18 | 100 |
| P (ethylene) Grade 4/PE | | | | | |
| Nylon-Glass 33% | 1.38 | 115 | 5 | 4 | 100 |
| DMC P(ester) | 1.80 | 40 | 9 | 3 | 130 |
| PEEK-Carbon 30% | 1.40 | 240 | 14 | 1.6 | 255 |

TABLE 6

Characteristics of Natural Fibers and Synthetic Fibers.

| | Density (g/cc) | Tensile Modulus (GPa) | Tensile Strength (MPa) | Failure Strain (%) |
|---|---|---|---|---|
| Natural fibers: | | | | |
| Flax | 1.52 | 100 | 0.84 | 2.0 |
| Hemp | 1.52 | 70 | 0.92 | 1.7 |

TABLE 6-continued

Characteristics of Natural Fibers and Synthetic Fibers.

| | Density (g/cc) | Tensile Modulus (GPa) | Tensile Strength (MPa) | Failure Strain (%) |
|---|---|---|---|---|
| Kenaf | 1.52 | 53 | 0.93 | 1.6 |
| Sisal | 1.52 | 38 | 0.86 | 2.7 |
| Wood | ~1 | 10–80 | ~1.5 | 1–3 |
| Jute | 1.52 | 60 | 0.86 | 2.0 |
| Synthetic fibers: | | | | |
| Glass | 2.5 | 72 | 2.5 | 2.5 |
| Carbon | 1.9 | 380 | 2.0 | 1–2 |
| Aramid | 1.4 | 125 | 2.8 | 2–4 |
| Metals | | | | |
| Aluminum | 2.8 | 73 | 0.47 | 10 |
| Steel | 7.8 | 200 | 0.40 | 30 |

FIG. 1 illustrates typical stress-strain behavior of a formulation made with natural fiber material. This example is illustrative of the typical stress-strain behavior exhibited by many product formulations manufactured in accordance with this invention. However, it will be understood that the specific data or values will vary according to the particular formulations and process parameters used in each case.

Further advantages of the present invention also include products with beneficial esthetic qualities including the smell of the final products. For example, finely powdered flax particles may be compressed under process conditions to yield a final product that is free from undesirable smells otherwise associated with processed flax. Consequently, powdered flax may be included in formulations described herein to produce parts for use in a wide variety of industries, including the automotive, aviation and electronics industries without imparting such undesirable smells.

Further useful modifications of the methods and products disclosed herein may be made without departing from the scope of this invention. Such useful modifications will be apparent to those skilled in the art and are intended to fall within the scope of the following claims.

REFERENCES

1. John Balantinecz and Tony Redpath on "Progress in Woodfiber-plastic composites.

Applications: from Autoparts to Composite Lumber", Ontario Apr. 24, 1994. Sponsored by University of Toronto, Ontario Center for Materials Research, UIR—University of Wisconson & USDA—Forest Service, Forest Products Laboratory.
2. A. S. Hermann and H. Hanselka, Institute of Structural Mechanics, German Aerospace Research Establishment on "Composites with biological fiber and matrix components".
3. Durafiber specification sheet, Cargill Limited.
4. R. J. Crawford, Plastic Engineering, 2e, Pergamon Press, U.K.

I claim:

1. A method of manufacturing a high density plant fiber material from powdered plant fibers comprising the steps of:

introducing into a mold a mixture comprising powdered plant fiber particles having a size of less than 500 microns ($5\times10^{-4}$ m) wherein the powdered plant fiber particles consist essentially of natural plant fibers which have not been preformed, thermoset binding agent between at least 0.1 per cent and 50 per cent by weight of the plant fiber particles, and the thermoset binding agent is selected from the group of agents consisting of unsaturated polyester resin, polymeric diphenyl methane di-isocyante, methane di-isocyante, melamine, urea, phenolic formaldehydes and ester containing compounds;

operating the mold at a temperature between 40° C. to 300° C.;

applying a pressure of at least 500 psi (3.4 Mpa) to the contents of the mold;

compressing the contents of the mold to an average density of at least 60 pounds per cubic foot (960 $Kg/m^3$); and removing the contents from the mold.

2. The method of claim 1 wherein the concentration of thermoset binding agent is more than 1 per cent and less than 25 per cent by weight of plant fibers.

3. The method of claim 1 wherein the concentration of thermoset binding agent is less than 10 per cent by weight of plant fibers.

4. The method of claim 1 wherein the concentration of thermoset binding agent is between 10 per cent and 25 per cent by weight of plant fibers.

5. The method of claim 2 wherein the size of the plant fiber particles is less than 250 micron ($2.5\times10^{-4}$ m).

6. The method of claim 3 wherein the size of the plant fibers is between 50 ($5\times10^{-5}$ m) and 250 microns ($2.5\times10^{-4}$ m).

7. The method of claim 2 wherein the pressure is more than 1000 psi (6.8 Mpa).

8. The method of claim 3 wherein the pressure is more than 2000 psi (13.6 Mpa).

9. The method of claim 5 wherein the pressure is more than 3000 psi (20.4 Mpa).

10. The method of claim 7 wherein the contents of the mold are compressed to an average density of more than about 75 pounds per cubic foot (1200 $Kg/m^3$).

11. The method of claim 7 wherein the contents of the mold are compressed to an average density of more than 80 pounds per cubic foot (1280 $Kg/m^3$).

12. The method of claim 8 wherein the contents of the mold are compressed to an average density of more than 90 pounds per cubic foot (1440 $Kg/m^3$).

13. The method of claim 1 wherein the mixture further comprises one or more mineral additives and non-mineral additives, the combination of mineral additives and non-mineral additives being in a concentration of between 2 per cent to 50 per cent by weight of plant fibers.

14. The method of claim 1 wherein the mixture further comprises mineral additives in a concentration of up to 30 per cent by weight of plant fibers.

15. The method of claim 1 wherein the mixture further comprises mineral additives in a concentration of up to 25 per cent by weight of plant fibers.

16. The method of claim 1 wherein the mixture further comprises mineral additives in a concentration of up to 10 per cent by weight of plant fibers.

17. The method of claim 13 wherein the mixture further comprises a coupling agent.

18. The method of claim 17 wherein the concentration of coupling agent is less than 0.5 per cent by weight of the mineral additives.

19. The method of claim 17 wherein the coupling agent is silane.

20. The method of claim 17 wherein the mineral additives are one or more mineral additives selected from the group of mineral additives consisting of silicates, silica, silica sand, and glass particles.

21. A method of forming a high density plant fiber product from powdered plant fibers, comprising the steps of:

a step of mixing one or both of (i) a first amount of powdered plant fiber having a size of less than 500 microns ($5\times10^{-4}$ m) wherein the powdered plant fibers consist essentially of natural plant fibers which have not been preformed, and a thermoset binding agent wherein the thermoset binding agent is selected from the group of agents consisting of unsaturated polyester resin, polymeric diphenyl methane di-isocyante, methane di-isocyante, melamine, urea, phenolic formaldehydes and ester containing compounds and (ii) a second amount of powdered plant fibers having a size of less than 500 microns ($5\times10^{-4}$ m) and one or more additives;

preparing a plant fiber mixture containing thermoset binding agent, wherein the thermoset binding agent is selected from the group of agents consisting of unsaturated polyester resin, polymeric diphenyl methane di-isocyante, methane di-isocyante, melamine, urea, phenolic formaldehydes and ester containing compounds, in a concentration of between 0.1 per cent and 50 percent by weight of powdered plant fiber, comprising mixing one or both of the first and second amounts with other additives;

introducing the mixture of plant fibers, additives, and other additives into the cavity of a mold;

compressing the mixture by applying a pressure of at least 500 psi (3.4 Mpa) to the surface of the mixture;

heating the mold cavity to between 40° C. to 300° C.;

compressing the contents of the mold to a density of at least 60 pounds per cubic foot (960 $Kg/m^3$); and removing the compressed contents from the mold.

22. The method of claim 21 wherein the plant fibers have a size of less than 250 microns ($2.5\times10^{-4}$ m).

23. The method of claim 22 wherein the pressure is more than 1000 psi (6.8 Mpa) and the contents of the mold are compressed to an average density of more than 80 pounds per cubic-foot (1280 $Kg/m^3$).

24. The method of claim 21 wherein the contents of the mold are compressed to an average density of more than about 75 pounds per cubic foot (1200 Kg/$m^3$).

25. The method of claim 24 wherein the concentration of thermoset binding agent is between 10 per cent and 25 per cent by weight of powdered plant fiber.

26. The method of claim 24 wherein the mixture of plant fibers and additives comprises a metallic stearate release agent.

27. The method of claim 25 wherein the mixture of plant fibers and additives comprises a release agent mixture of zinc stearate and calcium stearate.

28. The method of claim 26 wherein the release agent comprises magnesium stearate.

29. The method of claim 22 comprising the step of mixing a release agent with a predetermined amount of powdered plant fibers having a size of less than 250 microns ($2.5\times10^{-4}$ m).

30. A plant fiber product compressed to an average density of at least 60 pounds per cubic foot (960 Kg/$m^3$) made substantially from powdered plant fibers consisting essentially of natural plant fillers which have not been preformed, the fibers having a size of less 500 microns ($5\times10^{-4}$ m), and a thermoset binding agent in a concentration of between about 0.1 per cent and 50 per cent by weight of plant fiber, wherein the thermoset binding agent is selected from the group of agents consisting of unsaturated polyester resin, polymeric diphenyl methane di-isocyante, methane di-isocyante, melaminie, urea, phenolic formaldehydes and ester continuing compounds.

31. The product of claim 30 wherein the average density is at least 80 pounds per cubic foot (1280 Kg/$m^3$).

32. The product of claim 30 having an average density of at least 90 pounds per cubic foot (1440 Kg/$m^3$).

33. The product of claim 31 wherein the size of the plant fibers is less than 250 microns ($2.5\times10^{-4}$ m).

34. The product of claim 30 wherein the concentration of thermoset binding agent is less than 25 per cent by weight of plant fibers.

35. The product of claim 30 wherein the concentration of thermoset binding agent is between 10 per cent and 25 per cent by weight of plant fibers.

36. The product of claim 30 comprising mineral additives in a concentration of less than 50 per cent by weight of plant fibers.

37. The product of claim 30 comprising mineral additives in a concentration of less than 25 per cent by weight of plant fibers.

38. The product of claim 30 comprising mineral additives in a concentration of less than 10 per cent by weight of plant fibers.

39. The product of claim 37 comprising a coupling agent.

40. A plant fiber product mixture comprising plant fibers consisting essentially of natural plant fibers which have not been preformed and are between 20 ($2\times10^{-5}$ m) and 500 microns ($5\times10^{-4}$ m) in size, a release agent, and a concentration of thermoset binding agent of less than 50 per cent by weight of plant fibers, wherein the thermoset binding agent is selected from the group of agents consisting of unsaturated polyester resin, polymeric diphenyl methane di-isocyante, methane di-isocyante, melamine, urea, phenolic formaldehydes and ester containing compounds.

41. The product of claim 30 comprising one or more additives selected from the group of additives consisting of a release agent; catalyst; metallic particles; fire retardant; a surface agent; pigment; colouring agent; a mineral additive selected from the second group of additives consisting of silicates, silica, silica sand, sand, glass fibers, and glass beads; and a coupling agent.

42. The product mixture of claim 40 comprising mineral additives in a concentration between 1 per cent and 50 per cent by weight of plant fibers and a coupling agent.

43. The product mixture of claim 42 wherein the concentration of mineral additives is more than 2 per cent by weight of plant fibers.

44. The product mixture of claim 43 wherein the coupling agent is silane.

45. The product mixture of claim 44 wherein the plant fibers are less than 250 microns ($2.5\times10^{-4}$ m) in size.

46. The product of claim 42 wherein the mineral additives are one or more of the additives from the group of additives consisting of metallic particles, silicates, silica, silica sand or glass particles.

47. The method of claim 1 wherein the plant fiber mixture comprises one or more additives from the group of additives consisting of a release agent; catalyst; metallic particles; fire retardant; a surface agent; pigment; colouring agent; a mineral additive from the second group of additives consisting of silicates, silica, silica sand, sand, glass fibers, and glass beads; and a coupling agent.

48. The method of claim 2 wherein the temperature of the mold is between 100° C. and 220° C.

49. The method of claim 3 wherein the temperature of the mold is between 160° C. and 220° C.

50. A method of manufacturing a high density plant fiber material from powdered plant fibers which have not been preformed, comprising the steps of:

introducing into a mold a mixture comprising powdered plant fiber particles having a size of less than 500 microns ($5\times10^{-4}$ m), thermoset binding agent between at least 0.1 per cent and 50 per cent by weight of the plant fiber particles, and the thermoset binding agent is selected from the group of agents consisting of unsaturated polyester resin, polymeric diphenyl methane di-isocyante, methane di-isocyante, melamine, urea, phenolic formaldehydes and ester containing compounds;

operating the mold at a temperature between 40° C. to 300° C.;

applying a pressure of at least 500 psi (3.4 Mpa) to the contents of the mold;

compressing the contents of the mold to an average density of at least 75 pounds per cubic foot (1200 Kg/$m^3$); and removing the contents from the mold.

51. The method of claim 50 wherein the concentration of thermoset binding agent is more than 1 per cent and less than 25 per cent by weight of plant fibers.

52. The method of claim 50 wherein the concentration of thermoset binding agent is less than 10 per cent by weight of plant fibers.

53. The method of claim 51 wherein the contents of the mold are compressed to an average density of more than 80 pounds per cubic foot (1280 Kg/$m^3$).

54. The method of claim 51 wherein the contents of the mold are compressed to an average density of more than 90 pounds per cubic foot (1440 Kg/$m^3$).

55. The method of claim 51 wherein the mixture further comprises one or more mineral additives and non-mineral additives in a total concentration of between 2 per cent to 50 per cent by weight of plane fibers.

56. The method of claim 51 wherein the mixture comprises mineral additives in a concentration of up to 30 per cent by weight of plant fibers.

57. The method of claim 51 wherein the mixture comprises mineral additives in a concentration of up to 10 per cent by weight of plant fibers.

58. The method of claim 57 wherein the mixture further comprises a coupling agent.

59. The method of claim 58 wherein the mineral additives are one or more of the additives selected from the group consisting of silicates, silica, silica sand, and glass particles.

60. A method of forming a high density plant fiber product from powdered plant fibers which have not been performed, comprising the steps of:

a step of mixing one or both of (i) a first amount of powdered plant fiber having a size of less than 500 microns ($5\times10^{-4}$ m) and a thermoset binding agent wherein the thermoset binding agent is selected from the group of agents consisting of unsaturated polyester resin, polymeric diphenyl methane di-isocyante, isocyante, methane di-isocyante; melamine, urea, phenolic formaldehydes and ester containing compounds and (ii) a second amount of powdered plant fiber of less than 500 microns ($5\times10^{-4}$ m) and one or more additives;

preparing a plant fiber mixture containing thermoset binding agent, wherein the thermoset binding agent is selected from the group of agents consisting of unsaturated polyester resin, polymeric diphenyl methane di-isocyante, methane di-isocyante, melamine, urea, phenolic formaldehydes and ester containing compounds, in a concentration of between 0.1 per cent and 50 percent by weight of powdered plant fiber, comprising mixing one or both of the first and second amounts with other additives;

introducing the plant fiber mixture into the cavity of a mold;

compressing the mixture by applying a pressure of at least 500 psi (3.4 Mpa) to the surface of the mixture;

heating the mold cavity to between 40° C. to 300° C.;

compressing the contents of the mold to a density of at least 75 pounds per cubic foot (1200 kg/$m^3$); and removing the compressed contents from the mold.

61. The method of claim 60 wherein the concentration of binding agent is between 0.1 per cent and 25 per cent by weight of powdered plant fiber.

62. The method of claim 60 wherein the concentration of binding agent is between 10 per cent and 25 per cent by weight of powdered plant fiber.

63. The method of claim 50 wherein the powdered plant fiber particles have a moisture content of between 5 and 20 per cent by weight of plant fibers.

64. A method of manufacturing a high density plant fiber material from powdered plant fibers which have not been preformed, comprising the steps of:

introducing a mold a mixture comprising powdered plant fiber particles having a size of less than 500 microns ($5\times10^{-4}$ m) and a moisture content of between 5 and 20 percent by weight of plant fibers, thermoset binding agent between at least 0.1 per cent and 25 per cent by weight of the plant fiber particles, and the thermoset binding agent is selected from the group of agents consisting of unsaturated polyester resin, polymeric diphenyl ethane di-isocyante, methane di-isocyante, melamine, urea, phenolic formaldehydes and ester containing compounds;

operating the mold at a temperature between 40° C. to 300° C.;

applying a pressure of at least 500 psi (3.4 Mpa) to the contents of the mold;

compressing the contents of the mold to an average density of at least 60 pounds per cubic foot (960 Kg/$m^3$); and removing the contents from the mold.

65. The method of claim 64 wherein the concentration of thermoset binding agent is less than 10 per cent by weight of plant fibers.

66. The method of claim 65 wherein the mixture further comprises one or more mineral additives and non-mineral additives in a total concentration of between 2 per cent to 10 per cent by weight of plant fibers.

67. A method of manufacturing a high density plant fiber material from powdered plant fibers which have not been preformed, comprising the steps of:

introducing into a mold a mixture comprising powdered plant fiber particles having a size of less than 500 microns ($5\times10^{-4}$ m), thermoset binding agent between at least 0.1 per cent and 10 per cent by weight of the plant fiber particles, and the thermoset binding agent is selected from the group of agents consisting of unsaturated polyester resin, polymeric diphenyl methane di-isocyante, methane di-isocyante, melamine, urea, phenolic formaldehydes and ester containing compounds;

operating the mold at a temperature between 40° C. to 300° C.;

applying a pressure of at least 2000 psi (13.6 Mpa) to the contents of the mold;

compressing the contents of the mold to an average density of at least 75 pounds per cubic foot (1200 Kg/$m^3$); and removing the contents from the mold.

68. A method of manufacturing a high density plant fiber material from powdered plant fibers which have not been preformed, comprising the steps of:

introducing into a mold a mixture comprising powdered plant fiber particles having a size of less than 250 microns ($5\times10^{-4}$ m), thermoset binding agent in a concentration of more than 1 per cent and less than 25 per cent by weight of the plant fiber particles, and the thermoset binding agent is selected from the group of agents consisting of unsaturated polyester resin, polymeric diphenyl methane di-isocyante, methane di-isocyante, melamine, urea, phenolic formaldehydes and ester containing compounds;

operating the mold at a temperature between 40° C. to 300° C.;

applying a pressure of at least 3000 psi (20.4 Mpa) to the contents of the mold;

compressing the contents of the mold to an average density of at least 75 pounds per cubic foot (1200 Kg/$m^3$); and removing the contents from the mold.

69. A method of manufacturing a high density plant fiber material from powdered plant fibers which have not been preformed, comprising the steps of:

introducing into a mold a mixture comprising powdered plant fiber particles having a size of less than 500 microns ($5\times10^{-4}$ m), thermoset binding agent in concentration which is more than 1 per cent and less than 25 per cent by weight of the plant fiber particles, and the thermoset binding agent is selected from the group of agents consisting of unsaturated polyester resin, polymeric diphenyl methane di-isocyante, methane di-isocyante, melamine, urea, phenolic formaldehydes and ester containing compounds;

operating the mold at a temperature between 40° C. to 300° C.;

applying a pressure of at least 1000 psi (6.8 Mpa) to the contents of the mold;

compressing the contents of the mold to an average density of at least 75 pounds per cubic foot (1200 $Kg/m^3$); and removing the contents from the mold.

70. The method of claim 69 wherein the contents of the mold are compressed to an average density of more than 80 pounds per cubic foot (1280 $Kg/m^3$).

71. The method of claim 70 wherein the contents of the mold are compressed to an average density of more than 90 pounds per cubic foot (1440 $Kg/m^3$).

72. A plant fiber product compressed to an average density of at least 75 pounds per cubic foot (1200 $Kg/m^3$) made substantially from powdered plant fibers containing protolignin, the fibers having a size of less than 500 microns ($5\times10^{-4}$ m), and a thermoset binding agent in a concentration of between about 0.1 per cent and 50 per cent by weight of plant fiber, wherein the thermoset binding agent is selected from the group of agents having unsaturated polyester resin, polymeric diphenyl methane di-isocyante, methane di-isocyante, melamine, urea, phenolic formaldehydes and ester containing compounds.

73. The product of claim 72 wherein the average density is at least 80 pounds per cubic foot (1280 $Kg/m^3$).

74. The product of claim 73 having an average density of at least 90 pounds per cubic foot (1440 $Kg/m^3$).

75. The product of claim 73 wherein the size of the plant fibers is less than 250 microns ($2.5\times10^{-4}$ m).

* * * * *